United States Patent [19]

Grasso et al.

[11] 4,098,296
[45] Jul. 4, 1978

[54] VARIABLE AREA REED FLOW RESTRICTOR

[75] Inventors: Albert P. Grasso, Vernon; Paul F. Berg, South Windsor, both of Conn.

[73] Assignee: United Technologies Corporation, Hartford, Conn.

[21] Appl. No.: 754,269

[22] Filed: Dec. 27, 1976

[51] Int. Cl.² .............................................. F16K 15/14
[52] U.S. Cl. ........................................ 137/855; 138/46
[58] Field of Search ............... 137/855, 856, 857, 858; 138/45, 46

[56] References Cited

U.S. PATENT DOCUMENTS

| 2,095,656 | 10/1937 | Wells | 138/46 X |
| 2,593,315 | 4/1952 | Kraft | 138/45 |
| 3,057,373 | 10/1962 | Bragg | 137/855 X |
| 4,024,889 | 5/1977 | Smith | 137/855 |

FOREIGN PATENT DOCUMENTS

| 165,237 | 11/1933 | Switzerland | 137/856 |

Primary Examiner—Robert G. Nilson

[57] ABSTRACT

A variable area reed flow restrictor is presented in which a flexible reed spring is attached at one end to a plate having a shaped flow orifice and extends over the orifice. A fulcrum bar is connected to the plate to define a fulcrum about which the free end of the reed flexes. The fulcrum can be positioned to achieve a linear relationship between flow and pressure drop across the orifice.

8 Claims, 3 Drawing Figures

VARIABLE AREA REED FLOW RESTRICTOR

BACKGROUND OF THE INVENTION

This invention relates to the field of variable area flow restrictors. More particularly, this invention relates to variable area flow restrictors which exhibit a linear relationship between flow and pressure drop across the restrictor.

In many applications it is desired to obtain a linear relationship between variations in flow and variations in pressure drop across a restrictor in a line. However, a typical fixed area flow restrictor in a line results in a flow-pressure drop relationship in which the flow varies as a function of the square of the pressure drop across the restrictor.

In order to obtain a linear relationship between flow and pressure drop across a restrictor, the prior art has resorted to devices known as laminar type restrictors. Laminar type restrictors are pipes or conduits stuffed with fibrous material, and these devices exhibit a linear relationship between changes in flow and changes in pressure drop across them. However, these laminar devices of the prior art encounter a serious problem in that they get "wet". That is, they get soaked with the fluid flowing in the line or the vapor of the fluid flowing in the line, or they get dirty because they act somewhat like a filter. Therefore, over a period of time, these laminar type devices of the prior art exhibit serious and unacceptable shifts in performance and response.

Accordingly, there is a definite need for a simple and reliable restrictor which will exhibit a linear relationship between flow and pressure drop for various applications.

SUMMARY OF THE INVENTION:

In accordance with the present invention, a plate having a shaped orifice is positioned in a flow line. A flexible reed or leaf of spring material is fastened at one end to the orifice plate, and the reed extends so that it covers the orifice in the unflexed position of the reed. A fulcrum bar is attached to the plate between the fixed end and the free end to define a flex axis for the reed. Flow through the flow orifice will cause the reed to deflect about the flex axis determined by the fulcrum bar. The deflection of the reed, and hence the flow, through the orifice, will vary with changes in flow in the line. It has been determined in accordance with the present invention that the fulcrum bar can be positioned to define a flex axis for the reed such that the relationship between flow through the orifice and pressure drop across the orifice will be substantially linear. It has also been established in accordance with the present invention that the position of the fulcrum bar may be varied to define different flex axes of the reed whereby the pressure drop versus flow characteristics across the variable area restrictor may exhibit a range of characteristics from that of a relief valve to that of a typical fixed area orifice.

Accordingly, one object of the present invention is to provide a novel and improved variable area flow restrictor.

Another object of the present invention is to provide a novel and improved variable area reed flow restrictor.

Still another object of the present invention is to provide a novel and improved variable area flow restrictor which exhibits a laminar flow characteristic wherein flow varies in a linear relationship with pressure drop across the restrictor.

Another object of the present invention is to provide a novel and improved adjustable variable area reed flow restrictor in which the relationship between flow and pressure drop across the restrictor may be varied.

Other objects and advantages of the present invention will be apparent to and understood by those skilled in the art from the following detailed description and drawings.

BRIEF DESCRIPTION OF THE DRAWING

Referring now to the drawings, wherein like elements are numbered alike in the several figures.

DESCRIPTION OF THE PREFERRED EMBODIMENT

Figure 1:
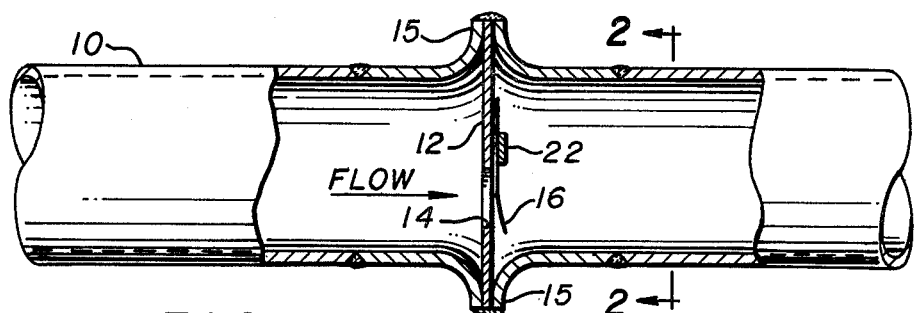
FIG. 1 is a horizontal elevation view, partially in section, of a flow conduit incorporating the variable area reed flow restrictor of the present invention.

Referring to FIG. 1, a fluid flow conduit 10 is shown. Conduit 10 may, for example, be a fluid supply line to an ejector, or it may be part of any other environment in which it is desired to have a linear relationship between flow and pressure. Flow in conduit 10 is from left to right as indicated by the flow arrow. A circular orifice plate 12 is positioned in conduit 10, and plate 12 is secured in its location by any suitable means. A circular orifice 14 is located in plate 12, so that any of the flow passing from upstream of plate 12 to a position downstream of plate 12 must pass through orifice 14.

A variable area flow restrictor interacts with orifice 14 to regulate the relationship between pressure and flow through orifice 14. This variable area flow restrictor, which may be seen in more detail in FIG. 2, includes a leaf spring 16 of generally rectangular configuration. One end of leaf spring 16 along the major axis thereof is attached to orifice plate 12 such as by spot welding at 18 or by any other suitable means. Leaf spring 16 is disposed along its major axis relative to orifice 14 so that the free end 20 of the leaf spring extends slightly beyond orifice 14 so that the entire orifice is covered by the leaf spring. Leaf spring 16 is positioned on the downstream side of orifice plate 12, when there is not flow in conduit 10, leaf spring 16 will lie flat against orifice plate 12, but leaf spring 16 will flex in the downstream direction to define a variable opening or orifice between the leaf spring and plate 12. It is important that the conduit be sized to permit free flow of the fluid once it passes the reed. Thus, the pipe may be expanded by flanges 15 or other appropriate means to provide a large volume downstream of plate 12.

A fulcrum bar extends across leaf spring 16 in the direction of the minor axis of the leaf spring. Fulcrum bar 22 is attached to orifice plate 12 and bears against the downstream surface of leaf spring 16 so that the edge of fulcrum bar 24 closest to the free end 20 of the leaf spring defines a flex axis for the leaf spring. Fluid forces acting on the leaf spring to urge it away from orifice 14 will flex the leaf spring about the flex axis defined by the edge 24 of the fulcrum bar. Fulcrum bar 22 is located on a pair of tracks 26 parallel to the major axis of leaf spring 16, so the position of the fulcrum bar can be adjusted relative to the major axis of the leaf spring to vary the location of the flex axis. Set screws 28 are provided to lock the flex bar in position.

Figure 2:
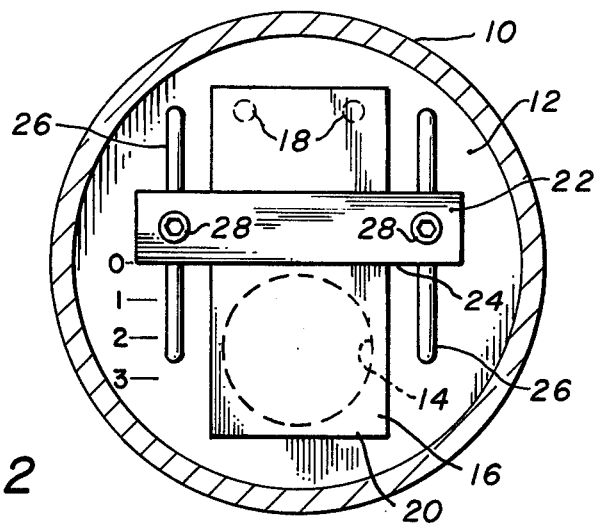
FIG. 2 is a view taken along line 2—2 of FIG. 1.

As has been previously indicated, the variable area flow restrictor defined by the action of spring 16 relative to orifice plate 12 can produce a flow-pressure characteristic where the flow through the variable area restriction varies linearly relative to the pressure drop across the restriction. The fluid pressure drop across the variable area orifice is a function of several variables, such as the elasticity, thickness and width of reed 16, the position of the flex axis defined by fulcrum bar 22, and the range of fluid flow rates. The diameter or shape of the orifice hole 14 is not critical as long as the hole is large enough so as not to be a significant flow restriction relative to the restriction defined between the reed and the orifice plate. In order to establish the proper position the fulcrum bar 22 to achieve the desired linear relationship between fluid flow and pressure drop, the fulcrum bar is positioned against reed 16 at position zero to establish an initial flex axis. The fluid flow-pressure drop relationship through the variable area restriction is then calibrated by causing the fluid to flow. The position of fulcrum bar 22 is then adjusted upward or downward until the flex axis is established at which there is a linear relationship between flow through the flexible orifice and the pressure drop across the orifice. Referring to FIG. 2, the line marked "LINEAR" would correspond to the position of flex bar 22 at which the desired linear flow-pressure drop relationship is established. That LINEAR line in FIG. 2 would, for example, correspond to the flex axis position 2 in FIG. 2.

Figure 3:
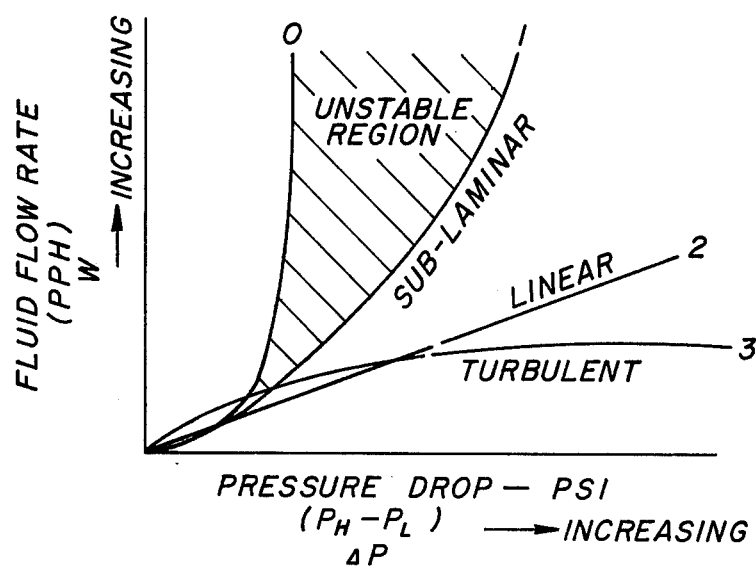
FIG. 3 is a graph showing the relationship of fluid flow versus pressure drop.

Depending on the position of fulcrum bar 22, and hence the flex axis, the flow-pressure drop relationship may vary from the curve marked "0" in FIG. 3 to the curve marked "3" in FIG. 3, each of those curves corresponding to the "0"-"3" markings of the flex axis in FIG. 2. The "0" curve shows a flow-pressure relationship which is typical of the flow characteristics of a relief valve where the valve is essentially full open once a desired pressure has been reached. The curve marked "1" shows a slight upward flow-pressure drop characteristic which may be called sub-laminar. This flow characteristic is usually obtainable only with a considerably more complicated control device than the reed valve of the present invention. The area between curve "0" and curve "1" indicates a relatively unstable region of the reed valve. The curved marked "2" shows a linear flow-pressure drop relationship which, in the prior art, has been obtained only with the use of laminar flow devices which have known disadvantages as discussed above. The reed valve of the present invention is considerably smaller than prior art laminar flow devices and is not sensitive to "wetting" and will not become contaminated as laminar flow devices are prone to do. The curve marked "3" shows a turbulent flow characteristic typical of a fixed area orifice. Based on the curves shown in FIG. 3, it can be seen that the present invention is not only capable of producing a variable flow restrictor having a linear flow-pressure drop relationship, but may also be adjusted to provide a range of flow-pressure drop characteristics as may be desired.

In some configurations, it may be desirable to provide a biasing leak in the system by sizing the reed so that it covers less than the entire orifice in the plate. This will refine the operating characteristics at low flow rates.

While preferred embodiments have been shown and described, various modifications and substitutions may be made thereto without departing from the spirit and scope of the invention. Accordingly, it will be understood that the present invention has been described by way of illustration and not limitation.

What is claimed is:

1. A variable area flow restrictor, including:
   orifice defining means having an opening for the passage of fluid;
   flexible spring means connected to said orifice defining means and extending over at least part of said opening, part of said spring means being free to move relative to said opening to define a variable flow area;
   fulcrum means bearing against said spring means to define a flex axis for said part of said spring means free to move to determine a low versus pressure drop relationship for fluid flow through said variable flow area; and
   means for adjusting the position of said fulcrum means to vary the flow versus pressure drop relationship of said restrictor.

2. A variable area flow restrictor as in claim 1 wherein:
   said fulcrum means is adjustable between one flex axis in which the flow versus pressure drop relationship through said variable flow area approximates that of a relief valve and another flex axis in which the flow versus pressure drop relationship through said variable flow area approximates a fixed area orifice.

3. A variable area flow restrictor as in claim 1 wherein:
   said fulcrum means is positioned to define a flex axis in which the flow versus pressure drop relationship through said variable flow area is approximately linear.

4. A variable area flow restrictor for establishing a desired relationship between flow and pressure in a conduit, the restrictor including plate means in a conduit blocking the full flow of fluid in the conduit;
   orifice means in said plate means to provide a flow passage;
   leaf spring means, said leaf spring means being connected at a first part of said plate means and having a second part extending over at least part of said orifice means, said second part being free to move relative to said orifice means in response to fluid flow through said orifice means to define a variable flow area;
   fulcrum means bearing against said spring means between said first and second parts of said spring means to define a flex axis for said second part of said spring means to determine a flow versus pressure drop relationship for fluid flow through said variable flow area; and
   means for adjusting the position of said fulcrum means to vary the flow versus pressure drop relationship of said restrictor.

5. A variable area flow restrictor as in claim 4 wherein:
   said fulcrum means is positioned to define a flex axis in which the flow versus pressure drop relationship through said variable flow area is approximately linear.

6. A variable area flow restrictor as in claim 4 wherein:
   said leaf spring means is rectangular in shape with the major axis thereof extending from said first part to said second part.

7. A variable area flow restrictor as in claim 4 wherein:
    said fulcrum means is mounted on said plate means.

8. A variable area flow restrictor as in claim 7 wherein:
    said fulcrum means is adjustable between one flex axis in which the flow versus pressure drop relationship through said variable flow area approximates that of a relief valve and another flex axis in which the flow versus pressure drop relationship through said variable flow area approximates a fixed area orifice.

* * * * *

UNITED STATES PATENT AND TRADEMARK OFFICE
CERTIFICATE OF CORRECTION

PATENT NO. : 4,098,296
DATED : July 4, 1978
INVENTOR(S) : Albert P. Grasso and Paul F. Berg It is certified that error appears in the above-identified patent and that said Letters Patent are hereby corrected as shown below:

Column 3, line 17, "the" (first occurrence) should be --for--

Column 4, line 15 (col. 1, line 11) "low" should be --flow--

Signed and Sealed this

Thirteenth Day of February 1979

[SEAL]

Attest:

RUTH C. MASON
Attesting Officer

DONALD W. BANNER
Commissioner of Patents and Trademarks